US009948732B2

(12) United States Patent
Choi et al.

(10) Patent No.: US 9,948,732 B2
(45) Date of Patent: Apr. 17, 2018

(54) METHOD FOR PROVIDING STATUS MESSAGING SERVICE IN ELECTRONIC DEVICE AND THE ELECTRONIC DEVICE THEREOF

(71) Applicant: Samsung Electronics Co., Ltd., Gyeonggi-do (KR)

(72) Inventors: Chi-Won Choi, Gyeonggi-do (KR); Jae-Yong Cho, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 304 days.

(21) Appl. No.: 14/596,195

(22) Filed: Jan. 13, 2015

(65) Prior Publication Data

US 2015/0200835 A1 Jul. 16, 2015

(30) Foreign Application Priority Data

Jan. 13, 2014 (KR) ........................ 10-2014-0004135

(51) Int. Cl.
*G06F 15/16* (2006.01)
*H04L 29/08* (2006.01)
*H04L 29/06* (2006.01)

(52) U.S. Cl.
CPC .......... *H04L 67/16* (2013.01); *H04L 65/1006* (2013.01); *H04L 67/147* (2013.01); *H04L 65/1016* (2013.01)

(58) Field of Classification Search
CPC . H04L 65/1006; H04L 65/1016; H04L 67/24; H04W 80/10
See application file for complete search history.

(56) References Cited

U.S. PATENT DOCUMENTS

| 2007/0026876 | A1* | 2/2007 | Freilich | .................. G08G 1/20 455/461 |
| 2010/0262660 | A1 | 10/2010 | Little et al. | |
| 2013/0024912 | A1 | 1/2013 | Jeon | |
| 2013/0198382 | A1* | 8/2013 | Wang | .................. H04L 65/1069 709/225 |
| 2014/0011492 | A1* | 1/2014 | Bharadwaj | .......... H04L 65/1016 455/422.1 |

* cited by examiner

*Primary Examiner* — Tauqir Hussain
*Assistant Examiner* — Kamran Mohammadi

(57) ABSTRACT

An electronic device provides a status messaging service. The electronic device includes a communication module, a display module, and a processor that is configured to acquire a status message of the electronic device, and during a service discovery operation, add the acquired status message to a session initiation protocol (SIP) Options message and transmitting the SIP Options message. A method includes acquiring a status message of the electronic device, and adding the acquired status message to a session initiation protocol (SIP) Options message and transmitting out the SIP Options message during a service discovery operation.

14 Claims, 14 Drawing Sheets

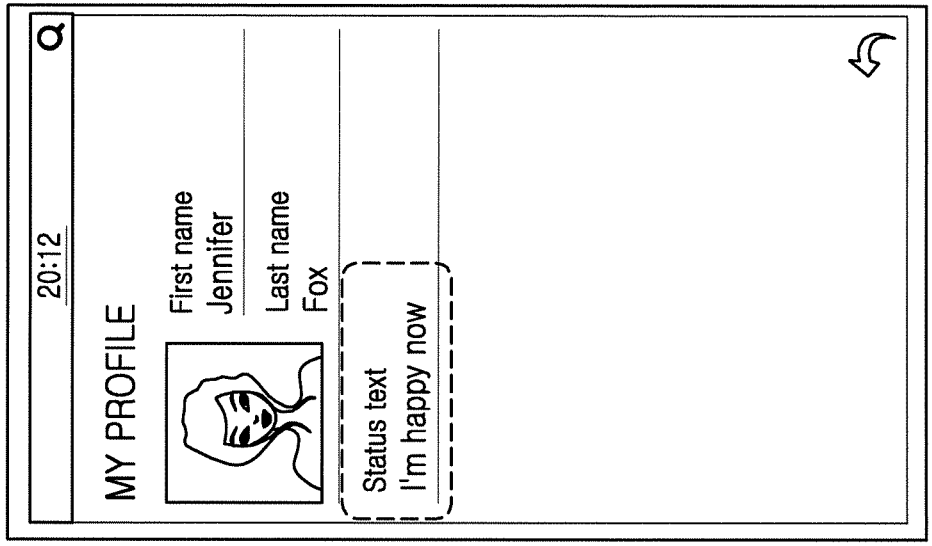
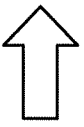
MY STATUS MESSAGE UPDATE
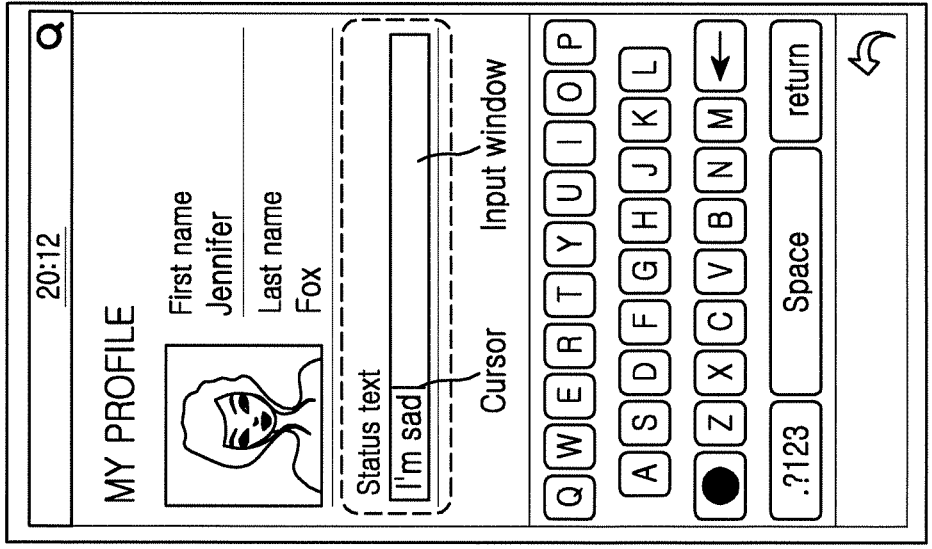
FIG.7A
FIG.7B

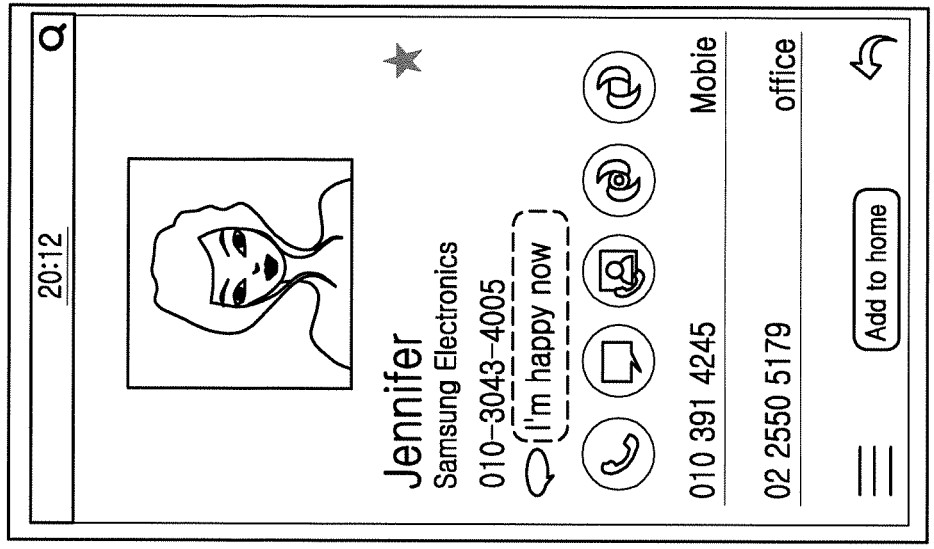
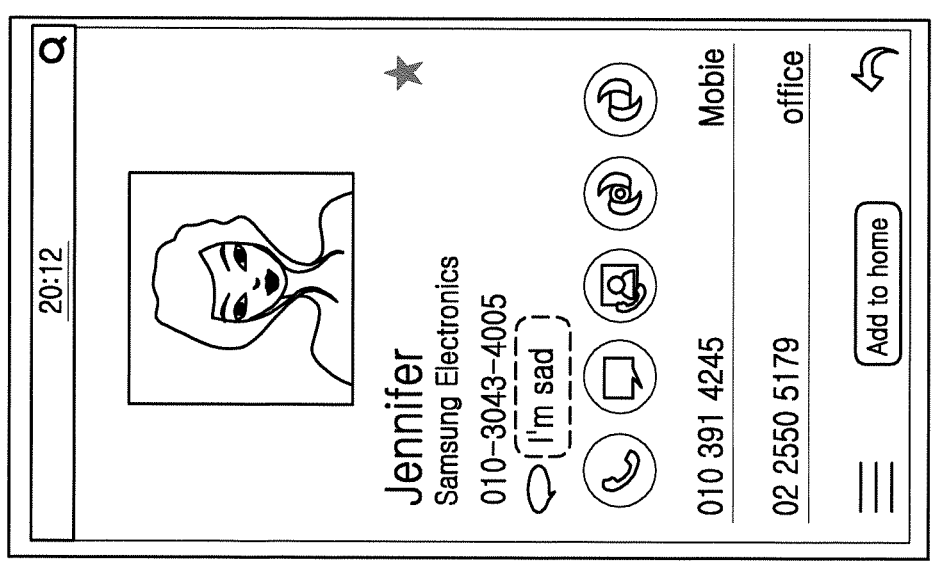
FIG.9A
FIG.9B

SIP OPTIONS

```
OPTIONS sip:carol@chicago.com SIP/2.0
Via: SIP/2.0/UDP pc33.atlanta.com;branch=z9hG4bKhjhs8ass877
Max-Forwards: 70
To: Carol sip:carol@chicago.com
From: Alice <sip:alice@atlanta.com>;tag=1928301774
Call-ID: a84b4c76e66710
CSeq: 63104 OPTIONS                    ①
Contact:<sip:alice@pc33.atlanta.com>;+g.3gpp.iari-ref="urn%3Aurn-7%3A3gpp-application.ims.iari.rcse.sm"
Accept: application/sdp
Content-Type: application/pidf+xml    ②
Content-Length: 360    ④

<?xml version="1.0" encoding="UTF-8"?>
<impp:presence xmlns:impp="urn:ietf:params:xml:ns:pidf"
  entity="pres:alice@atlanta.com">
  <impp:tuple id="sg89ae">
    <impp:status>
      <impp:basic>I'm happy</impp:basic>    ③
    </impp:status>
    <impp:contact priority="0.8">sip:alice@atlanta.com</impp:contact>
  </impp:tuple>
</impp:presence>
```

FIG.10

A simple example

```
<presence xmlns="urn:ietf:params:xml:ns:pidf" entity="sip:userB@xxx.com">
  <tuple id="Grandstream">
    <status>
      <basic>open</basic>
    </status>
    <contact priority="0.5">userB@xxx.com</contact>
  </tuple>
</presence>
```

FIG.11

METHOD FOR PROVIDING STATUS MESSAGING SERVICE IN ELECTRONIC DEVICE AND THE ELECTRONIC DEVICE THEREOF

CROSS-REFERENCE TO RELATED APPLICATION

The present application is related to and claims the benefit under 35 U.S.C. § 119(a) of a Korean patent application filed on Jan. 13, 2014 and assigned Serial Number 10-2014-0004135 the entire disclosure of which is hereby incorporated by reference.

TECHNICAL FIELD

The present disclosure relates to a method for providing a status messaging service in an electronic device and the electronic device thereof.

BACKGROUND

A rich communication suite (RCS) service is a mobile communication service for transferring multimedia data, such as voice, video, text, or the like, based on status information of counterparts stored in an address book of an electronic device, such as a smartphone or a tablet PC.

The RCS service has been deployed on a commercial scale primarily by European communication carriers and Korean communication carriers. However, the presence service is defined as an option function in a RCS communication protocol, and therefore, communication carriers that operate the presence server may not provide a presence service defined as an option.

SUMMARY

To address the above-discussed deficiencies, it is a primary object to provide a method for providing a status messaging service in an electronic device and the electronic device, which add a status message of an RCS service subscriber to a SIP Options message, and transmit the SIP Options message to a counterpart stored in an address book, regardless of a presence server.

Another embodiment of the present disclosure provides a method for providing a status messaging service in an electronic device and the electronic device, which parse a status message of an RCS service subscriber added to a SIP Options message, and update a status message of a counterpart stored in an address book, regardless of a presence server.

According to an aspect of the present disclosure, a method for providing a status messaging service in an electronic device includes acquiring a status message of the electronic device, and adding the acquired status message to a session initiation protocol (SIP) Options message and transmitting out the SIP Options message during a service discovery operation.

According to another aspect of the present disclosure, an electronic device includes a communication module, a display module, and a processor for acquiring a status message of the electronic device, and during a service discovery operation, adding the acquired status message to a session initiation protocol (SIP) Options message and transmitting out the SIP Options message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A-7B illustrate a diagram showing a state in which a status message is input according to an embodiment of the present disclosure;

FIGS. 9A-9B illustrate a diagram showing a state in which a status message of a counterpart is updated according to an embodiment of the present disclosure;

FIG. 10 illustrates a diagram showing an SIP Options message to which a status message is added according to an embodiment of the present disclosure;

FIG. 11 illustrates a diagram showing an example in which a status message is added as an XML message according to an embodiment of the present disclosure;

DETAILED DESCRIPTION

Figure 1:
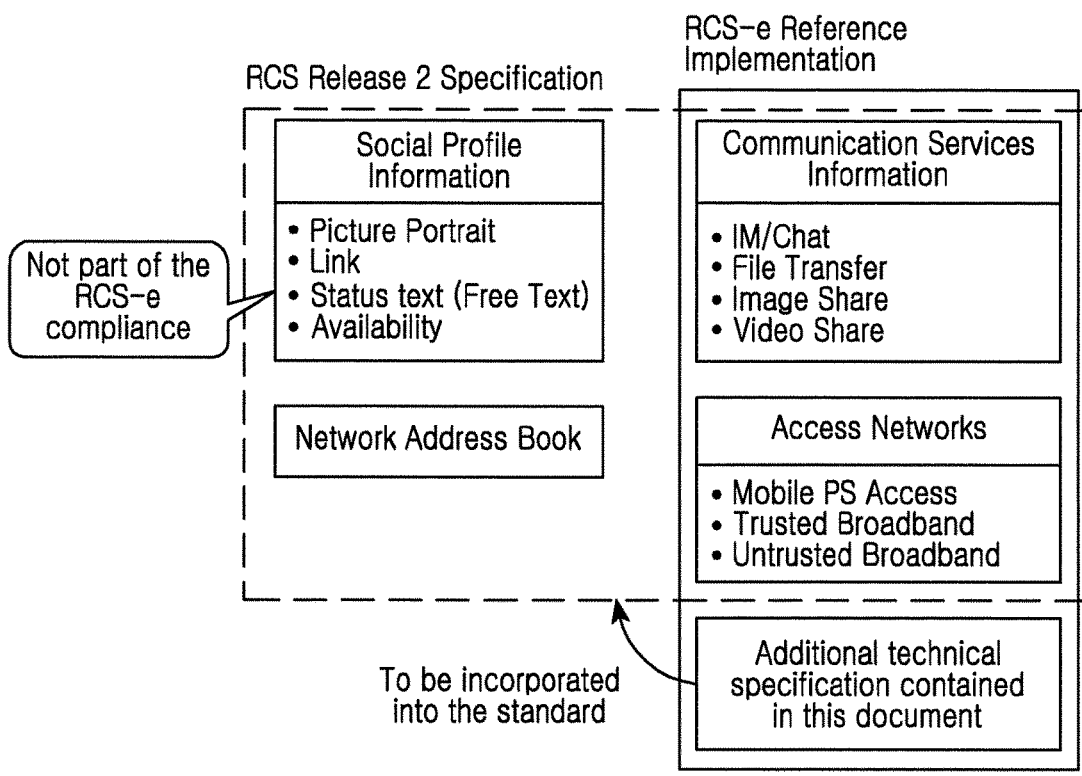
FIG. 1 illustrates a diagram schematically showing a RCS service.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure are described with reference to the accompanying drawings. Exemplary embodiments are illustrated in the drawings and will be described below in detail, but the present disclosure may include various embodiments and modifications. It should be understood, however, that there is no intent to limit the disclosure to the particular forms disclosed, but on the contrary, the disclosure is to cover all modifications, equivalents, and alternatives falling within the spirit and scope of the disclosure. In the drawings, similar reference numerals denote similar elements.

An electronic device according to embodiments of the present disclosure can be a device having a communication function. For example, the electronic device can be one or a combination of various devices, such as a smart phone, a tablet PC, a mobile phone, a video phone, an E-book reader, a desktop PC, a laptop PC, a netbook computer, a Personal Digital Assistant (PDA), a portable multimedia player (PMP), an MP3 player, a mobile medical device, an electronic bangle, an electronic necklace, an accessory, a camera, a wearable device, an electronic clock, a wrist watch, a smart white appliance (for example, a refrigerator, an air-conditioner, a cleaner, an intelligent robot, a television (TV), a digital video disk (DVD) player, an audio system, an oven, a microwave oven, a washing machine, an air cleaner, or a digital photo frame), various types of medical devices (for example, a magnetic resonance angiography (MRA) device, a magnetic resonance imaging (MRI) device, a computed tomography (CT) device, an imaging device, or an ultrasound imaging device), a navigation device, a GPS receiver, an event data recorder (EDR), a flight data recorder (FDR), a set-top box, a TV box (for example, Samsung HomeSync™, Apple TV™, or Google TV™), an electronic dictionary, a vehicle infotainment device, ship electronic equipment (for example, a ship navigation device or a gyrocompass device), an avionics device, a security device, an electronic clothing, an electronic key, a camcorder, a game console, a Head-Mounted Display (HMD), a flat panel display device, an electronic album, a furniture or a portion of a building/structure including a communication function, an electronic board, an electronic signature receiving device, and a protector. It is apparent that the electronic device according to embodiments of the present disclosure is not limited to the aforementioned devices.

FIG. 1 illustrates the RCS structure providing various services, such as service discovery, video share, image share, instant message chat, or file transfer.

Figure 2:
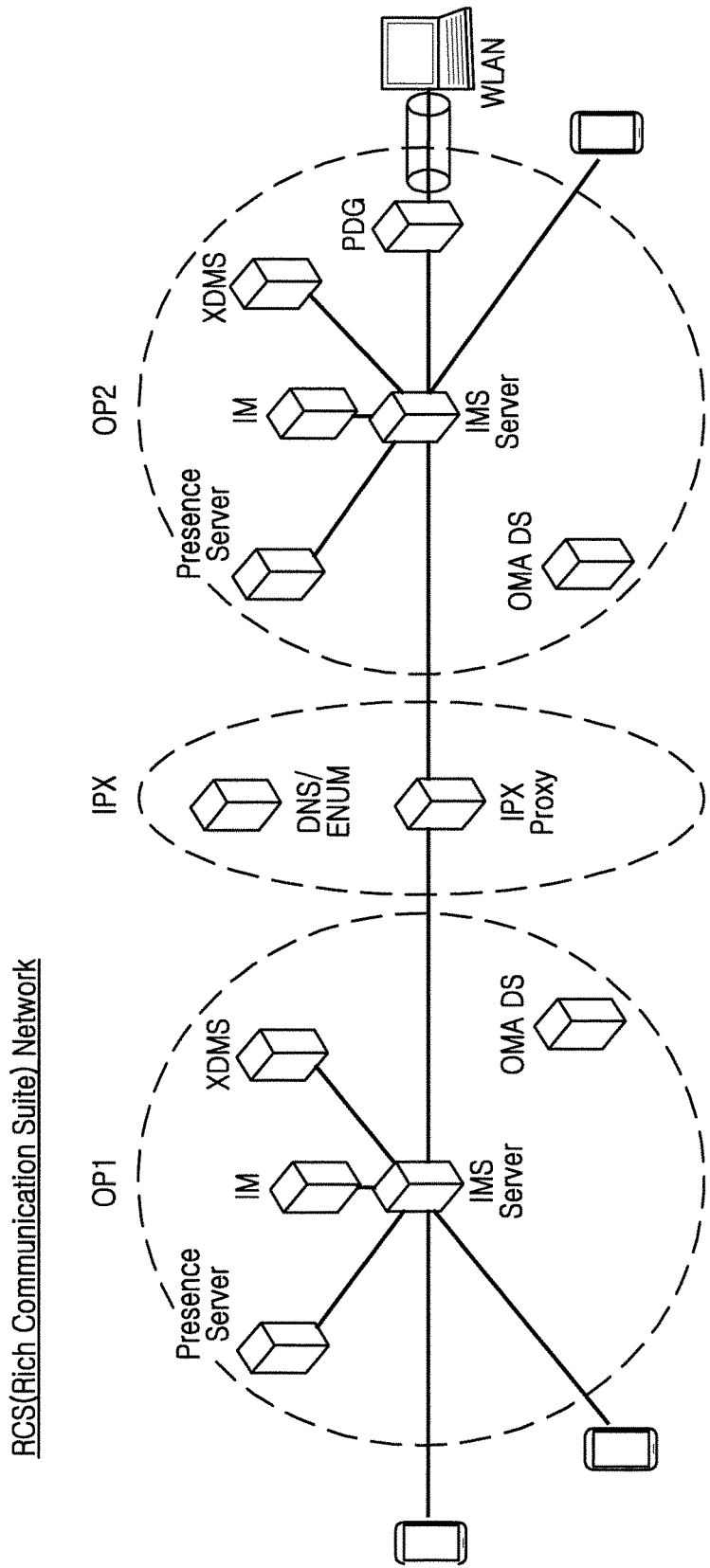
FIG. 2 illustrates a diagram showing an RCS network.

FIG. 2 illustrates a diagram showing an RCS network. An IP multimedia subsystem (IMS) server included in the RCS network provides a multimedia service, such as voice, audio, video and data, based on an Internet protocol (IP). The IMS server uses general-purpose Internet-based technologies and standardized network functions and improves a session management function regardless of an access network, thereby allowing easy interworking of applications of different networks and improving global interworking of services and conversion of wired and wireless networks.

The IMS server has been proposed in order for interworking and conversion between different mobile communication systems in a wide band code division multiple access (W-CDMA) network. However, the IMS server is currently developed into a technology of supporting not only a mobile communication system but also various IP-based wired/wireless integrated networks. A presence server included in the RCS network supports a presence service for providing presence information or status message information of an RCS service subscriber. The presence service is a service for receiving and storing presence information representing communication possibility and transferring the presence information in response to a request of a user which is registered as a buddy.

Figure 3:
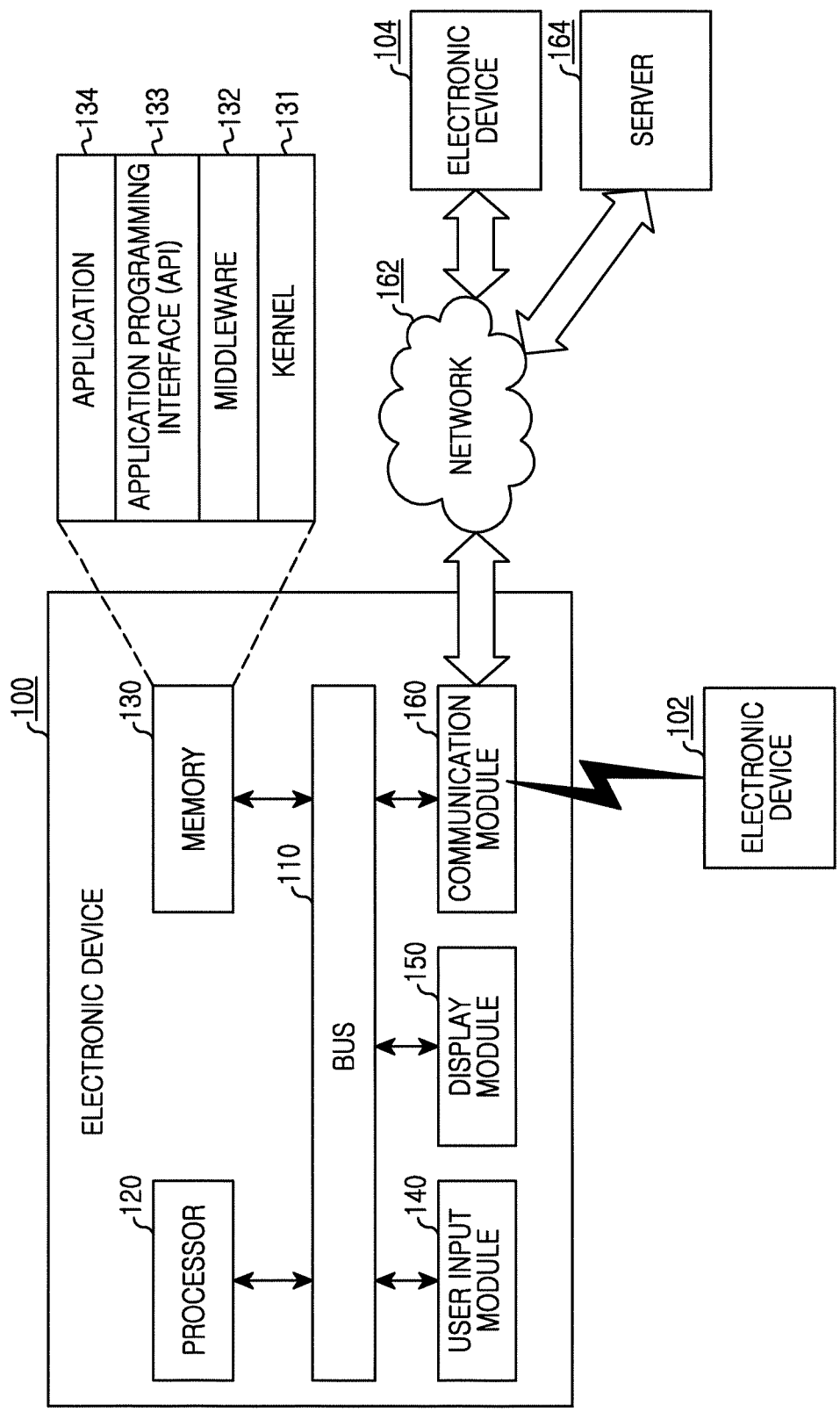
FIG. 3 illustrates a block diagram of an electronic device according to an embodiment of the present disclosure.

FIG. 3 illustrates a block diagram of an electronic device according to an embodiment of the present disclosure. Referring to FIG. 3, the electronic device 100 can include a bus 110, a processor 120, a memory 130, a user input module 140, a display module 150, and a communication module 160. The bus 110 can be a circuit that connects the aforementioned elements to one another and transfers communication (for example, a control message) between the aforementioned elements.

The processor 120 can receive a command from the aforementioned element (for example, the memory 130, the user input module 140, the display module 150, or the communication module 160) through, for example, the bus 110, decode the received command, and perform arithmetic operations or data processing according to the decoded command.

The memory 130 can store a command or data received from or generated by the processor 120 or another element (for example, the user input module 140, the display module 150, or the communication module 160). The memory 130 can include programming modules, such as, a kernel 131, middleware 132, an application programming interface (API) 133, and an application 134. The above programming module can be configured by software, firmware, hardware, or a combination of at least two thereof.

The kernel 131 can control or manage system resources (for example, the bus 110, the processor 120, or the memory 130) used to execute an operation or function implemented by the other programming modules, for example, the middleware 132, the API 133, or the application 134. The kernel 131 can provide an interface that allows the middleware 132, the API 133 or the application 134 to access, and control or manage each element of the electronic device 100.

The middleware 132 can perform a relay function such that the API 133 or the application 134 communicates with the kernel 131 for transmission and reception of data. In addition, the middleware 132 can perform load balancing of task requests received from a plurality of applications 134 in such a way that a priority of using the system resources (for example, the bus 110, the processor 120, or the memory 130) of the electronic device 100 is assigned to at least one application of the plurality of applications 134 according to the task requests.

The API 133 is an interface for allowing the application 134 to control a function provided by the kernel 131 or the middleware 132, and can include at least one interface or function for file control, window control, image processing, or text control for example. The user input module 140 can receive an instruction or data from, for example, a user and transfer the instruction or data to the processor 120 or the memory 130 through the bus 110. The display module can display an image, video, data, or the like to the user.

The communication module 160 can perform communication between another electronic device 102 and the electronic device 100, and support a predetermined short-range communication protocol (for example, wireless fidelity (WiFi), Bluetooth (BT), near-field communication (NFC)), or a predetermined network communication 162 (for example, Internet, local area network (LAN), wire area network (WAN), telecommunication network, cellular network, satellite network, or plain old telephone service (POTS)). The electronic devices 102 and 104 can be a device identical to (for example, same type) or different from (for example, different type) the electronic device 100.

Figure 4:
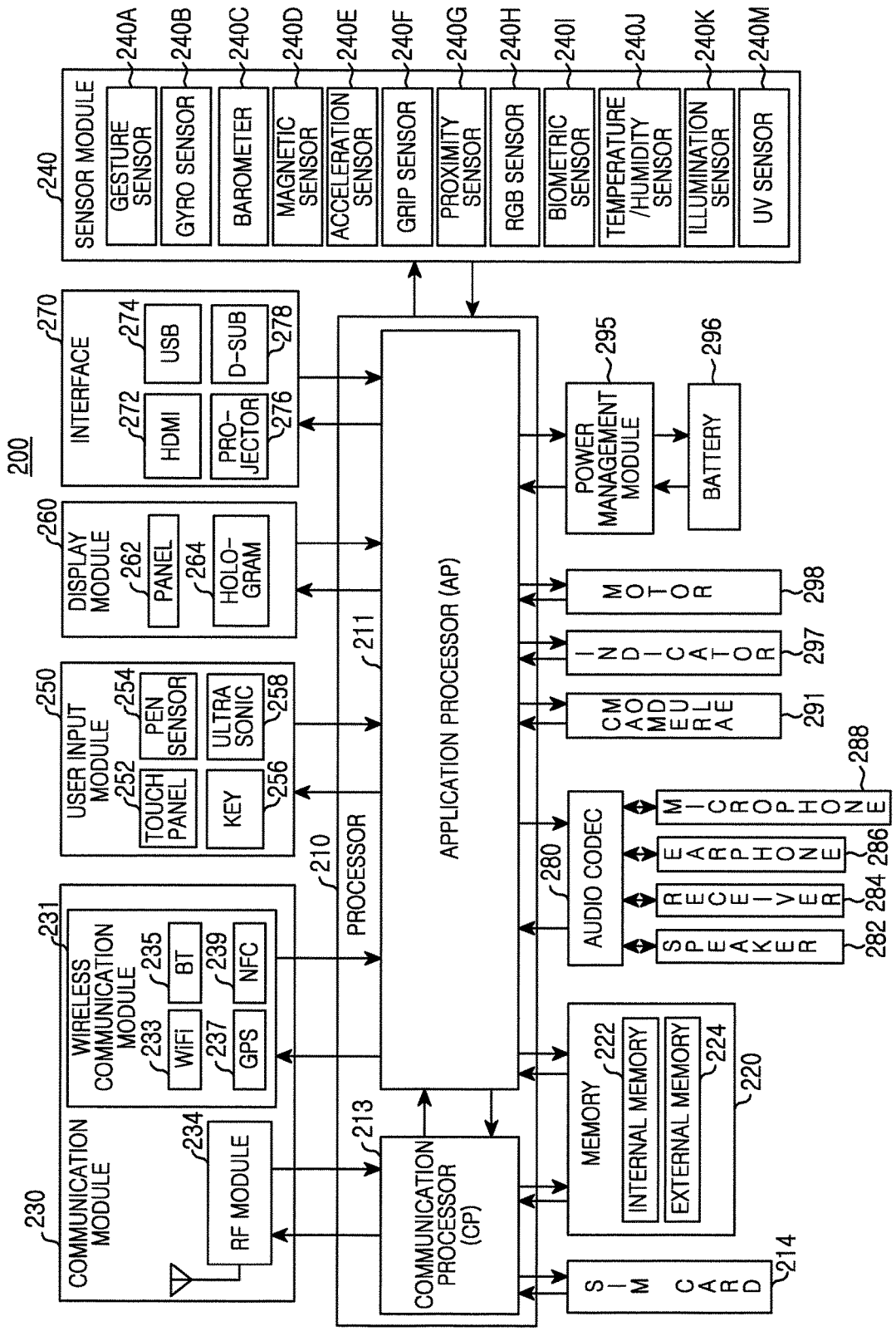
FIG. 4 illustrates a block diagram of hardware according to an embodiment of the present disclosure.

FIG. 4 illustrates a block diagram of hardware according to an embodiment of the present disclosure. The hardware 200 can be, for example, the electronic device 100 illustrated in FIG. 3. Referring to FIG. 4, the hardware 200 can include at least one processor 210, a subscriber identification module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (for example, the processor 120) can include at least one application processor (AP) 211 or at least one communication processor (CP) 213. The processor 210 can be, for example, the processor 120 illustrated in FIG. 1. Although the AP 211 and the CP 213 are illustrated as being included in the processor 210 in FIG. 3, the AP 211 and the CP 213 can be respectively included in different IC packages. According to an embodiment, the AP 211 and the CP 213 can be included in a single IC package.

The AP 211 can execute an operating system or an application program to control a plurality of hardware or software elements and perform processing and arithmetic operations of a variety of data including multimedia data. The AP 211 can be implemented by using, for example, a system on chip (SoC). According to an embodiment, the processor 210 can further include a graphic processing unit (GPU) (not illustrated).

The CP 213 can perform a function of managing data links for communication between the electronic device (for example, the electronic device 100) including the hardware 200 and other electronic devices connected to the electronic device through networks and converting communication protocols. The CP 213 can be implemented by using, for example, an SoC. According to an embodiment, the CP 213 can perform at least one of multimedia control functions. The CP 213 can perform identification and authentication of a terminal in a communication network by using, for example, a subscriber identification module (for example, the SIM card 214). The CP 213 can provide services, such as a voice call, a video call, a short messaging service (SMS) message, and packet data, to a user.

The CP 213 can control the data transmission and reception of the communication module 230. Although the elements, such as the CP 213, the power management module 295, or the memory 220, are illustrated as being provided separately from the AP 211, the AP 211 can be implemented to include at least one (for example, the CP 213) of the aforementioned elements according to an embodiment. According to an embodiment, the AP 211 and the CP 213 can load a command or data, which is received from a nonvolatile memory or another element connected to the AP 211 or the CP 213, into a volatile memory, and process the command or data.

The AP 211 or the CP 213 can store data received from or generated by at least one of other elements in the nonvolatile memory. The SIM card 214 can be a card implementing a subscriber identification module, or can be inserted into a slot formed in a specific location of the electronic device. The SIM card 214 can include unique identification information (for example, integrated circuit card identifier (IC-CID)) or subscriber information (for example, international mobile subscriber identity (IMSI)).

The memory 220 can include an internal memory 222 or an external memory 224. The memory 220 can be, for example, the memory 130 illustrated in FIG. 3. The internal memory 222 can include at least one of an volatile memory (for example, dynamic RAM (DRAM), static RAM (SRAM), or synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory).

According to an embodiment, the internal memory 222 can have a solid state drive (SSD) type. The external memory 224 can further include, for example, a compact flash (CF), a secure digital (SD), a micro-secure digital (Micro-SD), a mini-secure digital (Mini-SD), an extreme digital (xD), a memory stick, and the like.

The communication module 230 can include a wireless communication module 231 or an RF module 234. The communication module 230 can be, for example, the communication module 160 illustrated in FIG. 3. The wireless communication module 231 can include, for example, a WiFi module 233, a Bluetooth (BT) module 235, a GPS module 237, or a near field communication (NFC) module 239. For example, the wireless communication module 231 can provide a wireless communication function by using radio frequencies.

Additionally, or alternatively, the wireless communication module 231 can include a network interface (for example, LAN card) or a modem which connects the hardware 200 to a network (for example, Internet, local area network (LAN), wire area network (WAN), telecommunication network, cellular network, satellite network, or plain old telephone service (POTS).

The RF module 234 can perform transmission and reception of data, for example, transmission and reception of RF signals or requested electronic signals. Although not illustrated, the RF module 234 can include, for example, a transceiver, a power amp module (PAM), a frequency filter, or a low noise amplifier (LNA). The RF module 234 can further include a element for transmitting and receiving electromagnetic waves in free space for wireless communication, for example, a conductor or a conductive line.

The sensor module 240 can include at least one of, for example, a gesture sensor 240A, a gyro sensor 240B, a barometer 240C, a magnetic sensor 240D, an acceleration sensor 240E, a grip sensor 240F, a proximity sensor 240G, a RGB (red-green-blue) sensor 240H, a biometric sensor 240I, a temperature/humidity sensor 240J, a illumination sensor 240K, and an ultra violet (UV) sensor 240M. The sensor module 240 can measure a physical amount or detect an operation state of the electronic device, and convert measured or detected information into an electrical signal.

Additionally or alternatively, the sensor module 240 can include, for example, an E-nose sensor (not illustrated), an electromyography (EMG) sensor (not illustrated), an electroencephalogram (EEG) sensor, (not illustrated), an electrocardiogram (ECG) sensor (not illustrated), or a fingerprint sensor. The sensor module 240 can further include a control circuit for controlling at least one sensor included therein.

The user input module 250 can include a touch panel 252, a (digital) pen sensor 254, a key 256, or an ultrasonic input device 258. The user input module 250 can be, for example, the user input module 140 illustrated in FIG. 3. The touch panel 252 can recognize a touch input a touch input by using at least one of a capacitive method, a resistive method, an infrared method, and an ultrasonic method.

The touch panel 252 can further include a controller (not illustrated). In the embodiment of the capacitive method, direct touch and proximity recognition are possible. The touch panel 252 can further include a tactile layer. In this embodiment, the touch panel 252 can provide a tactile response to a user. The (digital) pen sensor 254 can be implemented by using, for example, an identical or similar method to a method for receiving a touch input, or a separate recognition sheet. For example, a keypad or a touch key can be used as the key 256.

The ultrasonic input device 258 is a device for detecting sound wave using a microphone (for example, the microphone 288) and identifying data through a pen for generating an ultrasonic signal in a terminal, and facilitates wireless recognition. According to an embodiment, the hardware 200 can receive a user input from an external device (for example, a network, a computer, or a server) connected thereto by using the communication module 230.

The display module 260 can include a panel 262 and a hologram 264. The display module 260 can be, for example, the display module 150 illustrated in FIG. 3. The panel 262 can be, for example, a liquid-crystal display (LCD) panel or an active-matrix organic light-emitting diode (AM-OLED) panel. The panel 262 can be implemented to be, for example, flexible, transparent, or wearable. The panel 262 can be configured as one module with the touch panel 252. The hologram 264 can allow a three-dimensional image to be displayed in space using optical interference. According to an embodiment, the display module 260 can further include a control circuit for controlling the panel 262 and the hologram 264.

The interface 270 can include, for example, a high-definition multimedia interface (HDMI) 272, a universal serial bus (USB) 274, a projector 276, or a D-subminiature (D-sub) 278. Additionally or alternatively, the interface 270 can include, for example, a secure digital (SD)/multi-media card (MMC) (not illustrated) or an infrared data association (IrDA) interface (not illustrated).

The audio codec 280 can perform conversion between voice and electrical signals. The audio codec 280 can perform conversion of voice information input or output through, for example, the speaker 282, a receiver 284, an earphone 286, or the microphone 288. The camera module 291 is a device for capturing an image and moving images. According to an embodiment, the camera module 191 can include at least one image sensor (for example, a front lens or a rear lens), an image signal processor (ISP) (not illustrated), or an flash LED (not illustrated).

The power management module 295 can manage power of the hardware 200. Although not illustrated, the power management module 295 can include, for example, a power management integrated circuit (PMIC), a charger integrated circuit (charger IC), or a battery fuel gauge.

The PMIC can be mounted in, for example, an integrated circuit or a SoC semiconductor. A charging method can include a wired charging method and a wireless charging method. The charger IC can charge a battery and prevent an overvoltage or overcurrent from being applied from a charger. According to an embodiment, the charger IC can include a charger IC employing at least one of a wired charging method or a wireless charging method. The wireless charging method can include, for example, a magnetic resonance method, a magnetic induction method, or an electromagnetic wave method. For example, an additional circuit for wireless charging, for example, a coil loop, a resonance circuit, or a rectifier can be included.

The battery gage can measure, for example, the amount of remaining power, or a voltage, a current, or a temperature during charging with respect to the battery 296. The battery 296 can generate electricity and supply power, and can be, for example, a rechargeable battery. The indicator 297 can indicate a specific state of the hardware 200 or a part thereof (for example, the AP 211), for example, a booting state, a massage state, or a charge state. The motor 298 can convert electrical signals into mechanical vibration. The MCU 299 can control the sensor module 240.

Although not illustrated, the hardware 200 can include a processing device (for example, GPU) for supporting a mobile TV. The processing device for supporting mobile TV services can process media data compliant with a standard, such as digital multimedia broadcasting (DMB), digital video broadcasting (DVB), or media flow.

The names of the aforementioned elements of the hardware according to various embodiments of the present disclosure can vary according to a type of the electronic device. The hardware according to various embodiments of the present disclosure can be configured by including at least one of the aforementioned elements. Some elements can be omitted from, or additional other elements can be further included in the hardware. When some of the elements of the hardware according to various embodiments of the present disclosure are combined into one entity, the one entity can perform the functions of the elements before combination.

Figure 5:
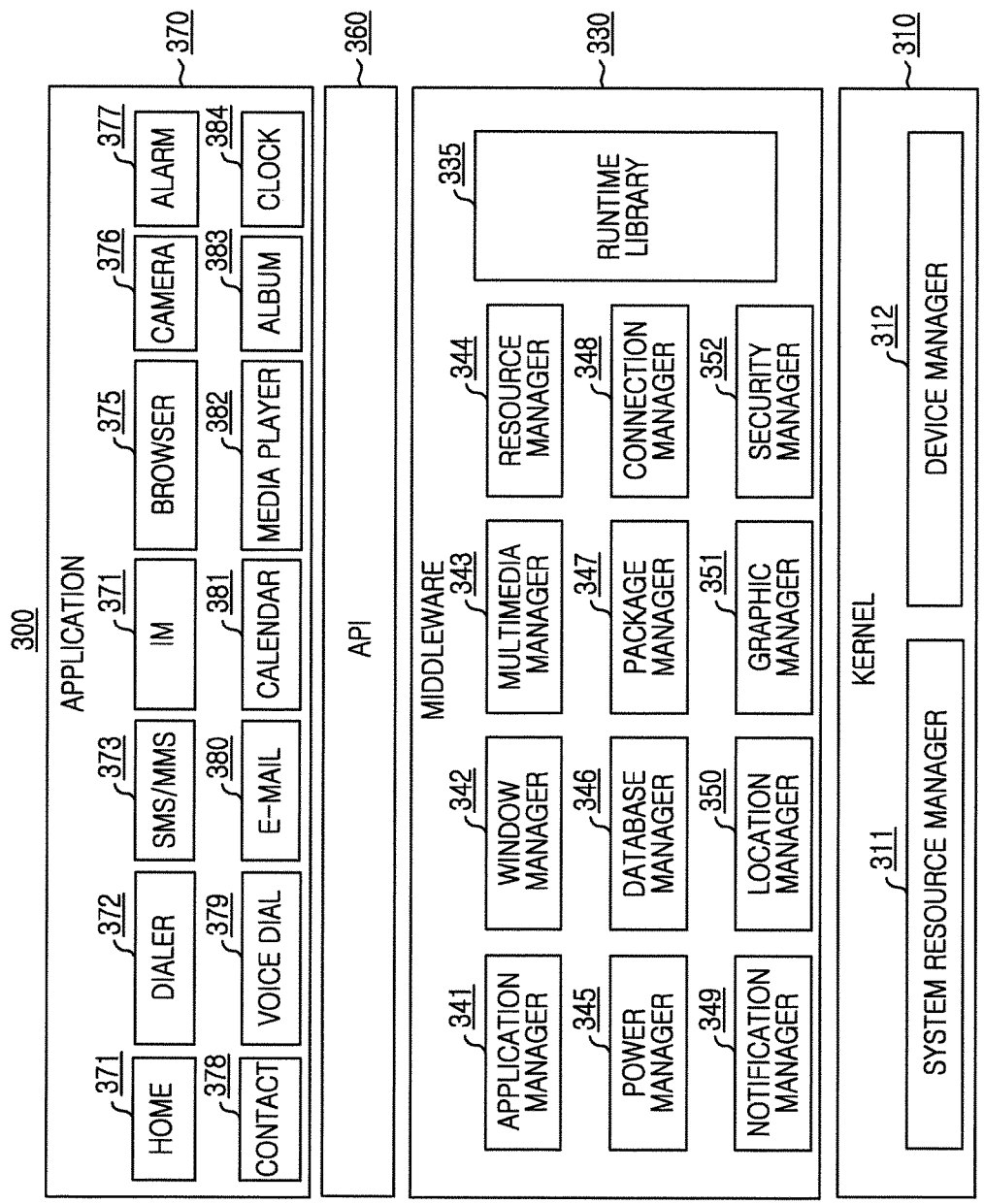
FIG. 5 illustrates a block diagram of a programming module according to an embodiment of the present disclosure.

FIG. 5 illustrates a block diagram of a programming module according to an embodiment of the present disclosure. The programming module 300 can be included (for example, stored) in the electronic device 100 (for example, the memory 130) illustrated in FIG. 3. At least a part of the programming module 300 can be configured by software, firmware, hardware, or a combination of at least two thereof.

The programming module 300 can include an operating system (OS) implemented in hardware (for example, the hardware 200), which controls resources related with the electronic device (for example, the electronic device 100), or various applications (for example, applications 370) which are driven on the OS. For example, the OS can be Android™, iOS™, Windows™, Symbian™, Tizen™, or Bada™. Referring to FIG. 5, the programming module 300 can include a kernel 310, middleware 330, an application programming interface (API) 360, or one or more applications 370.

The kernel 310 (for example, the kernel 131) may include a system resource manager 311 or a device driver 312. The system resource manager 311 may include, for example, a process management unit 313, a memory management unit 315, or a file system management unit 317. The system resource manager 311 may perform control, allocation, or deallocation of system resources. The device driver 312 can include, for example, a display driver 314, a camera driver 316, a Bluetooth driver 318, a shared memory driver 320, a USB driver 322, a keypad driver 324, a WiFi driver 326, or an audio driver 328. According to an embodiment, the device driver 312 can include an inter-process communication (IPC) driver (not illustrated).

The middleware 330 can include a plurality of modules which are implemented in advance in order to provide a function needed by the applications 370 in common. In addition, the middleware 330 can provide a function through the API 360 such that the application 370 efficiently uses limited system resources of the electronic device.

For example, as illustrated in FIG. 5, the middleware 330 (for example, the middleware 132) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include a library module used by a compiler in order to add a new function through a programming language, for example, during execution of the application 370. According to an embodiment, the runtime library 335 can execute functions associated with input/output, memory management, or arithmetic functions. The application manager 341 can manage a life cycle of at least one of the applications 370, for example. The window manager 342 can manage GUI resources used for a screen.

The multimedia manager 343 can identify formats used to reproduce various media files and perform encoding or decoding of the media files by using a codec suitable for each format. The resource manager 344 can manage resources, such as source codes of at least one of the applications 370, a memory, storage space, or the like. The power manager 345 can manage a battery and/or power, while operating together with a Basic Input/Output System (BIOS), and can provide power information used for operations. The database manager 346 can perform management to generate, search, and change a database to be used by at least one application of the applications 370.

The package manager 347 can manage installation or update of an application provided in the form of a package file. The connectivity manager 348 can manage wireless connectivity, such as WiFi or Bluetooth. The notification manager 349 can display or notify of an event, such as message reception, a promise, proximity notification, or the like in a manner without producing disturbance to the user. The location manager 350 can manage location information of the electronic device.

The graphic manager 351 can manage a graphic effect to be provided to the user or a related user interface. The security manager 352 can provide general security functions necessary for system security or user authentication. According to an embodiment, when an electronic device (for example, the electronic device 100) has a telephone call function, the middleware 330 can further include a telephony manager (not illustrated) for managing a voice and/or video communication function of the electronic device.

The middleware 330 can generate a new middleware module through a combination of various functions of the aforementioned internal element modules and use the middleware module. The middleware 330 can provide a module specified for each operating system type in order to a specific function. In addition, the middleware 330 can dynamically exclude some of existing elements or add new elements. Therefore, various embodiments of the present disclosure can exclude some of the aforementioned elements or add another element. Alternatively, one of the aforementioned elements can be substituted with a different element for performing a similar function.

The API 360 (for example, 133) is a collection of programming functions and can be provided in different configurations according to operating systems. For example, with Android or iOS, one API set can be provided for each of platforms, and with Tizen, two or more API sets can be provided. The applications 370, which can include an application similar to the application 134, can include, for example, a preloaded application and/or a third party application.

At least a part of the programming module 300 can be implemented by commands stored in a computer-readable storage media. When the commands are executed by at least one processor, e.g. the processor 210, at least one processor can perform functions corresponding to the commands. The computer-readable storage media can be, for example, the memory 260. The at least a part of the programming module 300 can be implemented (for example, executed) by the processor 210 for example.

The at least a part of the programming module 300 can include, for example, a module, a program, a routine, a set of instructions, or a process, which performs one or more functions. The names of the aforementioned elements of the programming module (for example, the programming module 300) according to the present disclosure can vary depending on the type of the OS. The programming module according to the present disclosure can include at least one of the aforementioned elements and/or can further include other additional elements, and/or some of the aforementioned elements can be omitted.

Operational principles of various embodiments of the present disclosure will be described herein below with reference to the accompanying drawings. In the following description, detailed descriptions of well-known functions or configurations will be omitted since they would unnecessarily obscure the subject matters of the present disclosure. Furthermore, terms to be described below have been defined by considering functions in various embodiments of the present disclosure, and can be defined differently depending on a user or operator's intention or practice. Therefore, the definitions of such terms are based on the descriptions of the entire present specification.

A method for providing a status message in an electronic device and the electronic device according to various embodiments of the present disclosure will be described below in detail. The electronic device according to various embodiments of the present disclosure can include elements illustrated in FIG. 4. The processor 210 of the electronic device 200 can be connected to a rich communication service (RCS) network through the communication module 230 and use a presence service for exchanging status messages between RCS service subscribers.

That is, when a presence serer included in the RCS network is normally operated, as described above with reference to FIG. 2, it is possible to exchange status messages between the RCS service subscribers using an existing presence service. However, when the presence server is not normally operated, the processor 210 performs a process for providing a status messaging service for exchanging status messages between RCS service subscribers, regardless of the presence server.

Figure 6:
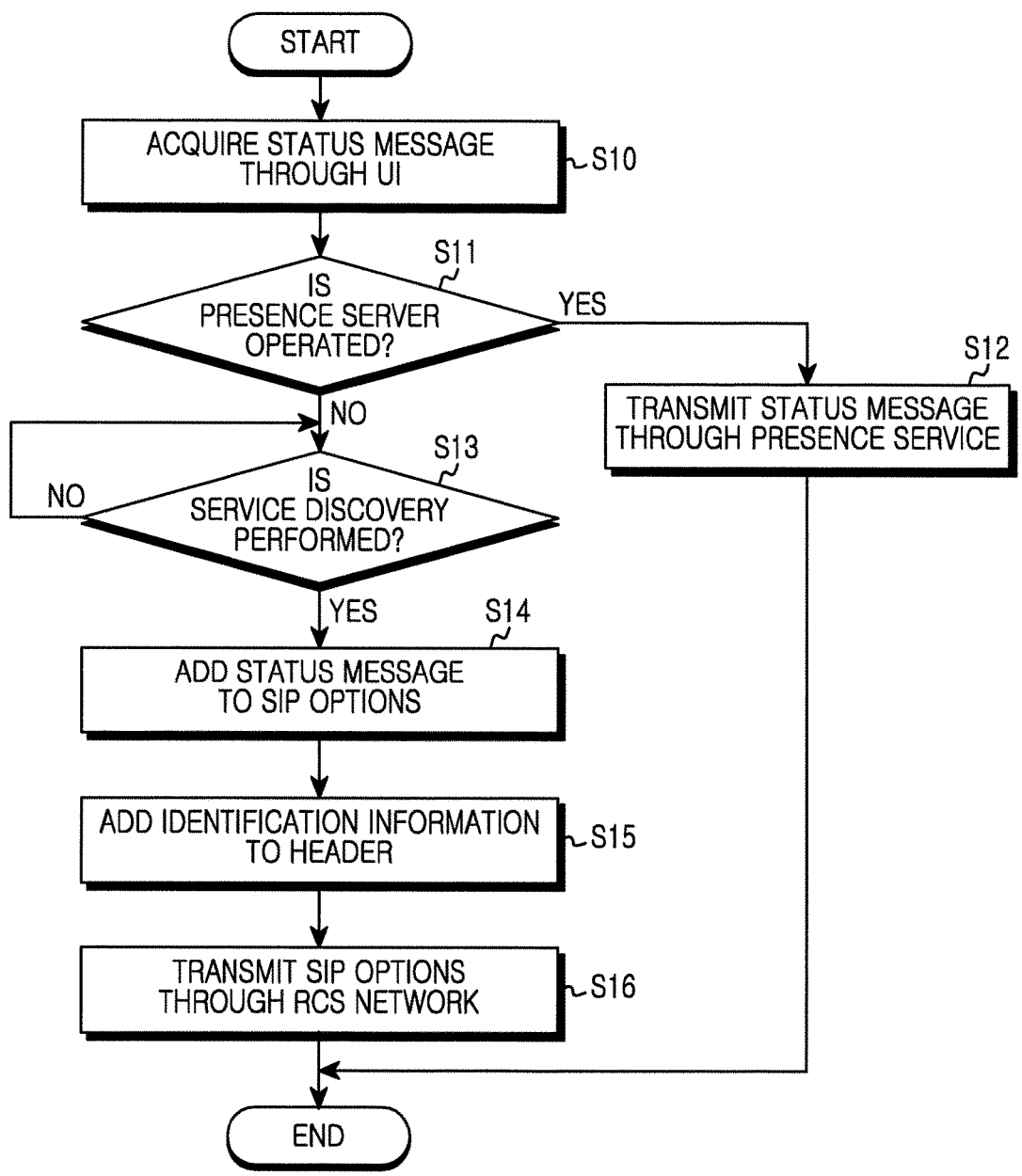
FIG. 6 illustrates a process for providing a status messaging service in an electronic device according to an embodiment of the present disclosure.

FIG. 6 illustrates a process for providing a status messaging service in an electronic device according to an embodiment of the present disclosure. The processor 210 of the electronic device 200 acquires the electronic device's status message which is input by a RCS service subscriber through a user interface. For example, as illustrated in FIGS. 7A-7B, the processor 210 executes a chat application program in response to a request of the user to display a status message of an RCS service subscriber on the display module 260.

The processor 210 replaces the status message (for example, I'm sad) displayed on the display module 260 with a new status message (for example, I'm happy) which is newly input through an input window of a user interface (UI) by the user. When acquiring the new status message as described above, the processor 210 transmits the status message to at least one counterpart which is stored in an address book (for example, Contact).

Figure 8:
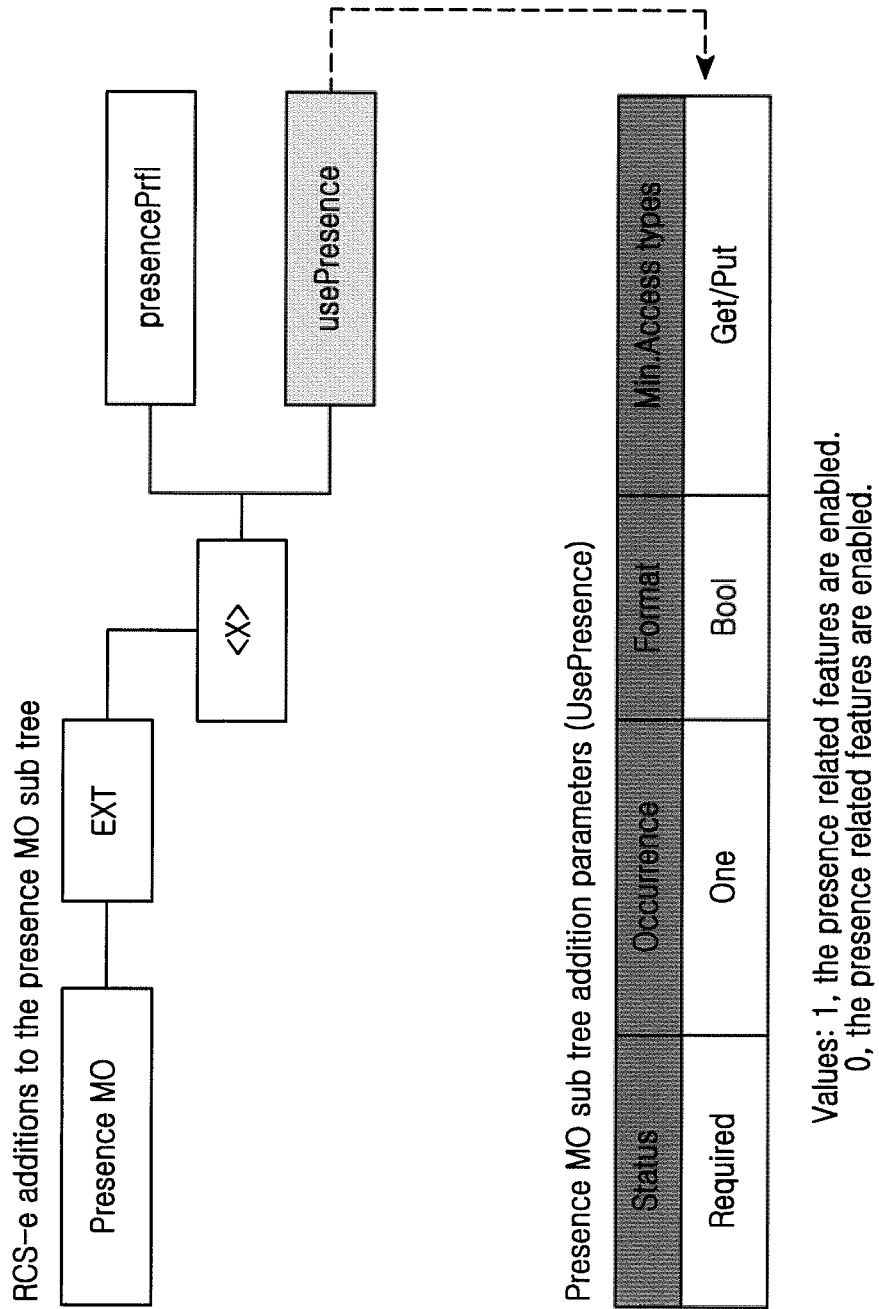
FIG. 8 illustrates a diagram showing identification information as to whether a presence server is operated according to an embodiment of the present disclosure.

The processor 210 extracts identification information indicating whether the presence server is operated from provision information received through the RCS network and determines whether the presence server is operated. For example, as illustrated in FIG. 8, "usePresence" that is identification information indicating whether the presence server is operated is included in the prevision information which is defined in a specification for an RCS protocol.

When a value of the "usePresence" is "1", it is indicated that the presence server is normally operated. When a value of the "usePresence" is "0", it is indicated that the presence server is not normally operated. When a value of the "usePresence" is "1", the processor 210 determines that the presence server is normally operated (operation S11), and then transmits the status message acquired through the user interface to a counterpart subscriber by using a general presence service supported by the presence server (operation S12).

Therefore, the previous status message (for example, I'm sad) is replaced with the new status message (for example, I'm happy), for example, as illustrated in FIGS. 9A-9B and the new status message is displayed on a display module of an electronic device of the counterpart subscriber which receives the new status message. When a value of the "usePresence" is "0", the processor 210 determines that the presence server is not normally operated. Thereafter, while performing a service discovery operation the processor 210 adds the status message, which is acquired through the user interface, to an Options message of a session initiation protocol (SIP) (hereinafter referred to as an "SIP Options message")(operation S14).

The SIP is a signaling protocol of an application layer, which defines a procedure of allowing intelligent terminals to identify each other, search for locations thereof, and establish, delete, or change a multimedia communication session between the intelligent terminals. The SIP has a request/response structure for controlling establishment, change or termination of a multimedia communication session, such as Internet-based conference, telephone, voice mail, event notification, or instant messaging. The SIP can be used in both the transmission control protocol (TCP) and the user datagram protocol (UDP), and provide a service by using an SIP URL similar to an email address for identification of users, without relying on an IP address.

Since the SIP is based on test developed by using the most of the Hyper Text Transfer Protocol (HTTP) and the simple mail transfer protocol (SMTP) as they are, the SIP is easily implemented and provides various services in cooperation with other protocols.

The processor 210 generates the SIP Options message which includes receiver information, originator information, the status message, and the like. For example, as illustrated in FIG. 10, the SIP Options message can include "sip: carol@chicago.com" as an example of the receiver information and "sip: alice@altanta.com" as an example of the originator information.

Also, identification information indicating that the status message of the originator is added to the body of the SIP Options message can be added to header information as tag information. For example, the identification information indicating whether the status message is added to the SIP Options message can be added as "+g.3gpp.iari-ref="urn%3Aurn-7%3A3gpp-application.ims.iari.rcse.sm" as indicated by reference symbol ① in FIG. 10.

Identification information indicating a type of the status message can be added to the header information as tag information. For example, the indication information indicating whether a type of the status message is a text message or an eXtensible Markup Language (XML) message can be added as "application/pidf+xml" as indicated by reference symbol ② in FIG. 10.

The status message added to the body of the Options message can be added as "<impp:basic>I'm happy</impp:basic>" for example, as indicated by reference symbol ③ in FIG. 10, and information indicating a length of the state message can be added as "Content-Length: 360" for example, as indicated by reference symbol ④ in FIG. 10. The XML message can be added to the SIP Options message in the form of a session description protocol (SDP), for example, as illustrated in FIG. 11.

Figure 12:
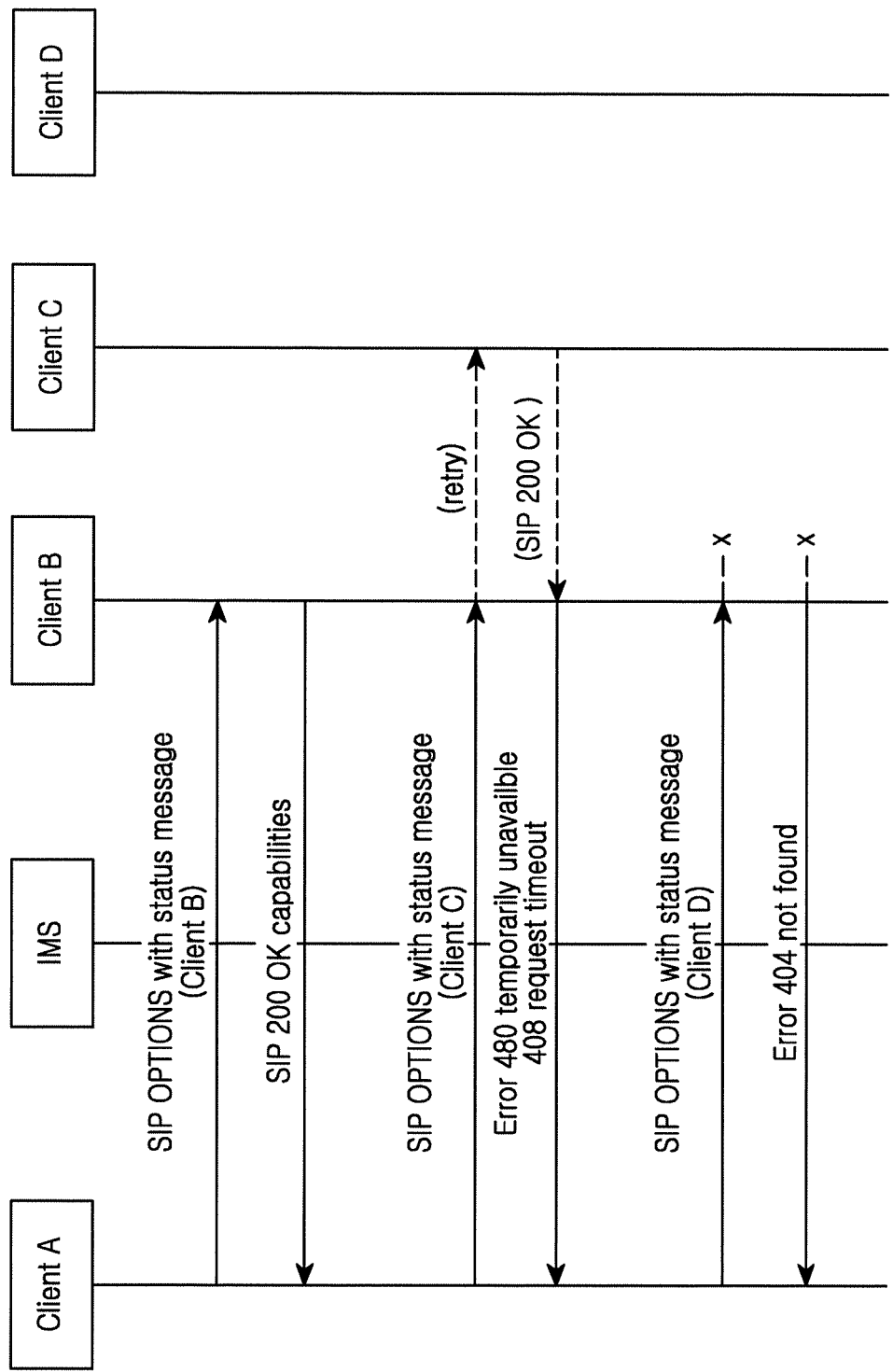
FIG. 12 illustrates a diagram showing an example in which an SIP Options message is transmitted to a plurality of clients according to an embodiment of the present disclosure.

The processor 210 transmits the SIP Options message, to which the status message and the identification information are added, to a counterpart subscriber through the RCS network (operation S16). For example, as illustrated in FIG. 12, a client A that is a RCS service subscriber transmits an SIP Options to which status message and identification information of the client A are added to a plurality of clients B, C and D stored in an address book (for example, Contact).

An IMS server included in the RCS network transmits the SIP Options message to relevant clients based on receiver information included in the SIP Options message. For example, as illustrated in FIG. 12, when the client B is an RCS service subscriber, and receives the SIP Options message normally, the client B transmits a response message (for example, SIP 200 OK) to the client A in response to the SIP Options message.

When the client C is an RCS service subscriber, and does not receive the SIP Options message due to, for example, a power-off state, the IMS server transmits an error message (for example, ERROR 480) representing temporary impossibility to the client A to the client A and retries transmission of the SIP Options message to the client C. That is, the client C receives the SIP Options message that has not been received due to the power-off state later since the IMS server retries transmission.

However, when the client D is not an RCS service subscriber, the IMS server transmits an error message (for example, Error 404) to the client A. The SIP Options message transmitted to the client A can be transmitted to the clients B and C that are RCS service subscribers through the IMS server in real time, or is temporarily held and then transmitted through retrying of transmission.

Figure 13:
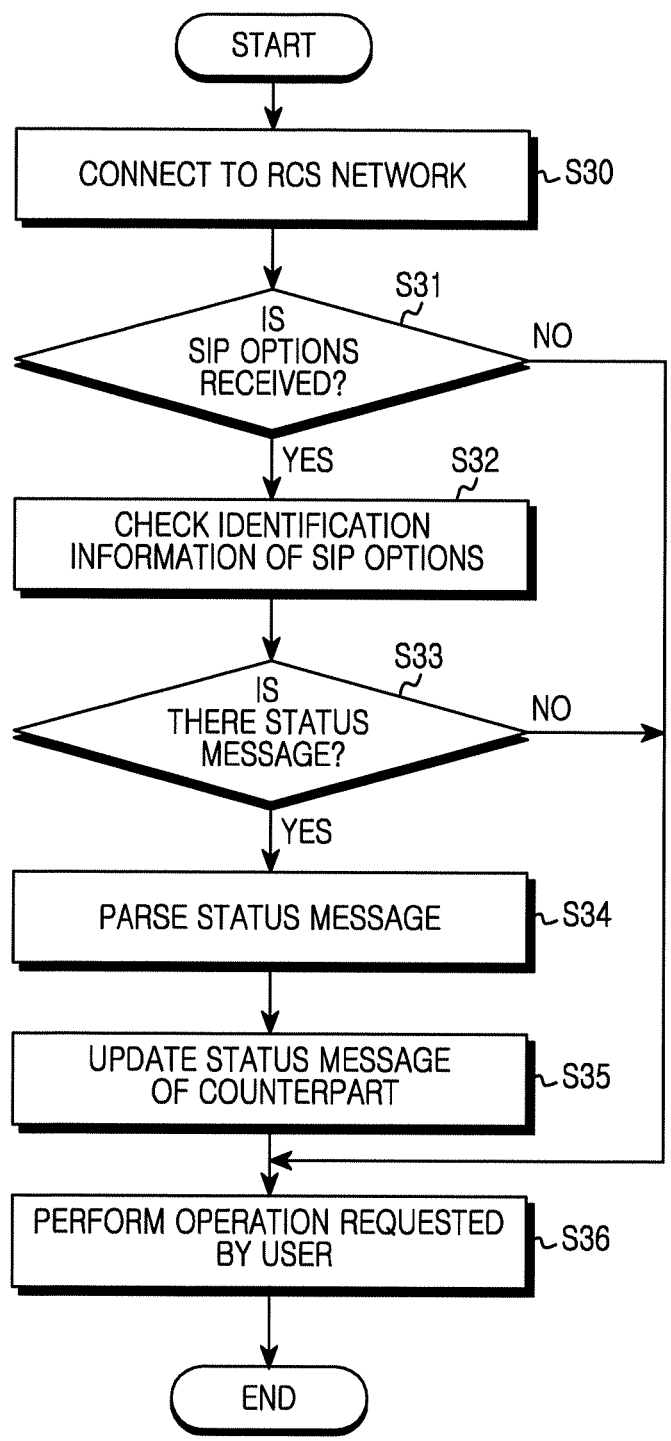
FIG. 13 illustrates a process for providing a status messaging service in an electronic device according to another embodiment of the present disclosure.

When the SIP Options message is received as described above, the status message added to the SIP Options message is parsed and a status message of a counterpart corresponding to the status message is updated with a new status message. For example, as illustrated in FIG. 13, the processor 210 is connected to the RCS network through the communication module 230 (operation S30). When the SIP Options message is received from another counterpart client (operation S31), the processor 210 searches for identification information which is added to the header information of the SIP Options message as tag information (operation S32).

It is possible to determine whether the status message is added to the body of the SIP Options message and a type of the status message, based on the identification information. When the status message is present as a result of the determination (operation S33), the processor 210 parses the status message (operation S34), and updates a status message of a relevant counterpart by referring to originator information (operation S35). Thereafter, the processor 210 performs an operation requested by a user (operation S36).

Figure 14B:
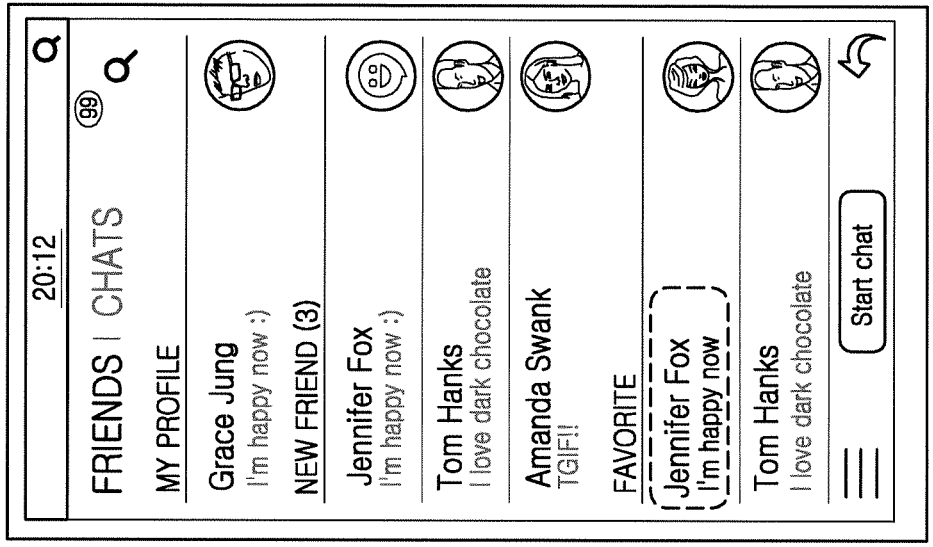
FIGS. 14A-14B illustrate a diagram showing an example in which a status message of a counterpart is updated in a chat list according to another embodiment of the present disclosure.
Figure 14A:
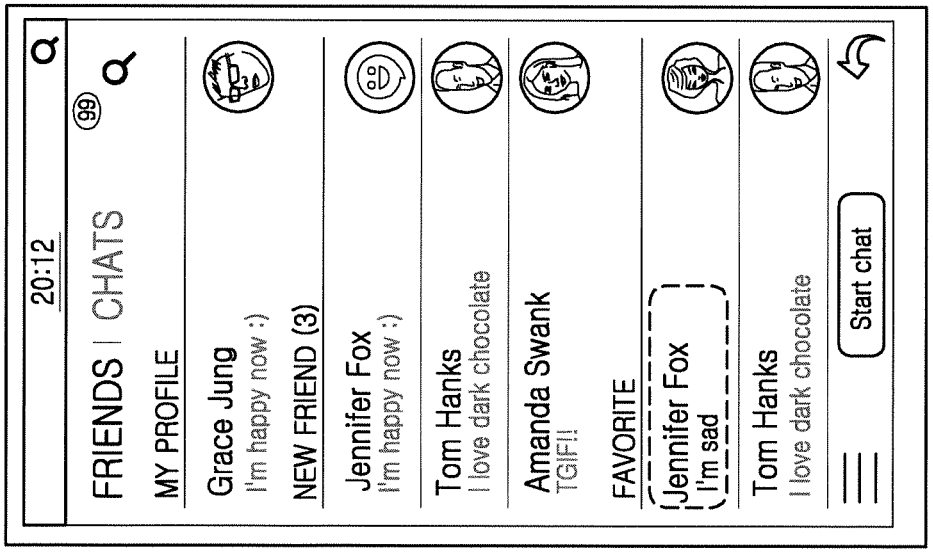

For example, when a counterpart corresponding to the originator information of the SIP Options message is Jenifer Fox, the parsed message is "I'm happy", a status message of Jenifer Fox stored in an address book (for example, Contact) is updated with "I'm happy"). As illustrated in FIG. 14, the status message of Jenifer Fox displayed on a chat list is changed to "I'm happy". In other words, although a presence server of the RCS network does not support a presence service, RCS service subscribers can exchange status messages of counterparts with one another by using the SIP Options message.

According to the embodiments of the present disclosure, various types of electronic devices, such as a smartphone or a tablet PC, add a status message of a RCS service subscriber to the SIP Options message and transmit the SIP Options message to an electronic device of a counterpart which is stored in an address book. Also, the electronic device of the counterpart parses the status message which is included in the SIP Options and updates a status message stored in its address book, which corresponds to the electronic device that transmits the SIP Options, thereby allowing the status message to be exchanged with each other between RCS service subscribers although a presence server of an RCS network does not support a presence service.

The methods according to the embodiments described in the claims or specification of the present disclosure can be implemented by hardware, software, or a combination thereof. When the methods are implemented by software, a computer-readable storage medium can be provided to store one or more programs (software modules). The one or more programs stored in the computer-readable storage medium can be configured for execution by one or more processors in an electronic device. The one or more programs can include instructions for causing the electronic device to execute the methods according to the exemplary embodiments described in the claims and/or specification of the present disclosure.

These programs (software modules or software) can be stored in a random access memory (RAM), a nonvolatile memory including a flash memory, a read only memory (ROM), an electrically erasable programmable ROM (EEPROM), a magnetic disc storage device, a compact disc-ROM (CD-ROM), a digital versatile disk (DVD), another type of optical storage device, or a magnetic cassette.

Also, the programs can be stored in a memory configured by a combination of some or all of such storage devices. Also, each configuration memory can be included in the plural form. Also, the programs can be stored in an attachable storage device that can be accessed by the electronic device through a communication network such as Internet, Intranet, local area network (LAN), wireless LAN (WLAN), or storage area network (SAN), or through a communication network configured by a combination thereof. This storage device can be connected through an external port to the electronic device performing the exemplary embodiments of the present disclosure. Also, a separate storage device on a communication network can be connected to the electronic device performing the exemplary embodiments of the present disclosure.

In the embodiments of the present disclosure, the elements included therein are expressed in a singular form or a plural form depending on the embodiments. The expressions of the singular form or the plural form have been properly selected depending on a situation for convenience of description. The present disclosure is not limited to a singular element or plural elements. Any element expressed in the singular form herein are meant to also include the plural form and vice versa.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method of an electronic device, comprising:
   displaying a user interface (UI) of a chat application including a user status area; and
   receiving, via the UI, a user input for changing a content included in the displayed user status area;
   in response to the receiving the user input for changing the content included in the user status area, identifying whether data is included in provision information received from a server, wherein the data is used for indicating whether another server configured for transmitting information on the changed content on the user status area exists;
   if the data is included in the provision information, transmitting, via the another server included in a rich communication suite (RCS) network to at least one external electronic device, the information on the changed content; and
   if the data is not included in the provision information, transmitting, via the server to the at least one external electronic device, a session initiation protocol (SIP) options message including the information on the user status area including the changed content,
   wherein the transmitted SIP options message further comprises header information for indicating whether the changed content is included in the SIP options message and indicating a type of the changed content.

2. The method of claim 1, wherein the server is IP multimedia subsystem (IMS) server, and wherein the another server is a presence server.

3. The method of claim 1, wherein the SIP options message is transmitted during an interval when the electronic device operates in a service discovery operation.

4. The method of claim 1, wherein the information on the user status area is configured for displaying, in the at least one external electronic device, changed content.

5. The method of claim 1, wherein the type of the changed content is one of a text and extensible markup language (XML) data, and
   wherein the XML data is added to a body of the SIP options in a form of a session description protocol.

6. The method of claim 1, wherein the information on the changed content is parsed by the at least one external electronic device, wherein the changed content is displayed, based on the parsed information, in a chat list of a chat application, and wherein the chat list is displayed in the at least one external electronic device.

7. The method of claim 1, wherein, if the at least one external electronic device operates in an idle state, the SIP options message is received from the server in response to a state of at least one external electronic device switched from the idle state to an active state.

8. An electronic device comprising:

a memory storing instructions;

a communication module;

a display module; and at least one processor, coupled to the communication module, the display module, and the memory, configured to execute the stored instructions to:

display a user interface (UI) of a chat application including a user status area;

receive, via the UI, a user input for changing a content included in the displayed user status area;

in response to the receiving the user input for changing the content included in the user status area, identify whether data is included in provision information received from a server, wherein the data is used for indicating whether another server configured for transmitting information on the changed content on the user status area exists;

if the data is included in the provision information, transmit, via the another server included in a rich communication suite (RCS) network to at least one external electronic device, the information on the changed content; and if the data is not included in the provision information, transmit, via the server to the at least one external electronic device, a session initiation protocol (SIP) options message including the information on the user status area including the changed content, wherein the transmitted SIP options message further comprises header information for indicating whether the changed content is included in the SIP options message and indicating a type of the changed content.

9. The electronic device of claim 8, wherein the server is IP multimedia subsystem (IMS) server, and wherein the another server is a presence server.

10. The electronic device of claim 8, wherein the SIP options message is transmitted during an interval when the electronic device operates in a service discovery operation.

11. The electronic device of claim 8, wherein the information on the user status area is configured for displaying, in the at least one external electronic device, the changed content.

12. The electronic device of claim 8, wherein the type of the changed content is one of a text and extensible markup language (XML) data, and wherein the XML data is added to a body of the SIP options in a form of a session description protocol.

13. The electronic device of claim 8, wherein, if the at least one external electronic device operates in an idle state, the SIP options message is received from the server in response to a state of at least one external electronic device switched from the idle state to an active state.

14. A non-transitory computer-readable storage medium for storing one or more programs for executing an operation of:

displaying a user interface (UI) of a chat application including a user status area;

receiving, via the UI, a user input for changing a content included in the displayed user status area;

in response to the receiving the user input for changing the content included in the user status area, identifying whether data is included in provision information received from a server, wherein the data is used for indicating whether another server configured for transmitting information on the changed content on the user status area exists;

if the data is included in the provision information, transmitting, via the another server included in a rich communication suite (RCS) network to at least one external electronic device, the information on the changed content; and if the data is not included in the provision information, transmitting, via the server to the at least one external electronic device, a session initiation protocol (SIP) options message including the information on the user status area including the changed content, wherein the transmitted SIP options message further comprises header information for indicating whether the changed content is included in the SIP options message and indicating a type of the changed content.

* * * * *